United States Patent
Lemetteil

(10) Patent No.: US 7,201,379 B2
(45) Date of Patent: Apr. 10, 2007

(54) SEAL ASSEMBLY, CARTRIDGE, AND METHOD

(75) Inventor: Claude Lemetteil, Manneville la Goupil (FR)

(73) Assignee: Dresser-Rand Company, Olean, NY (US)

( * ) Notice: Subject to any disclaimer, the term of this patent is extended or adjusted under 35 U.S.C. 154(b) by 45 days.

(21) Appl. No.: 10/287,294

(22) Filed: Nov. 4, 2002

(65) Prior Publication Data

US 2004/0084847 A1 May 6, 2004

(51) Int. Cl.
F16J 15/40 (2006.01)
F16J 15/44 (2006.01)
F16C 32/06 (2006.01)

(52) U.S. Cl. .................. 277/411; 277/413; 277/422; 277/431; 277/581; 384/100; 384/107; 384/119; 384/132

(58) Field of Classification Search ............... 277/431, 277/411, 400, 432, 413, 422, 581; 384/100, 384/107, 119, 132, 134
See application file for complete search history.

(56) References Cited

U.S. PATENT DOCUMENTS

| | | | |
|---|---|---|---|
| 3,053,583 A | 9/1962 | Shaw | |
| 3,411,794 A * | 11/1968 | Allen | ................. 277/414 |
| 3,580,587 A * | 5/1971 | Born et al. | ................. 277/318 |
| 3,620,581 A | 11/1971 | Heller et al. | |
| 3,704,920 A | 12/1972 | Pan | |
| 3,944,304 A | 3/1976 | Purtschert | |
| 3,998,502 A * | 12/1976 | Walter et al. | ............... 384/107 |
| 4,035,038 A | 7/1977 | Hinchcliffe et al. | |
| 4,076,259 A * | 2/1978 | Raimondi | ................... 277/430 |
| 4,094,512 A * | 6/1978 | Back | ............................ 277/320 |
| 4,199,152 A * | 4/1980 | Catterfeld | ................... 277/422 |
| 4,471,964 A * | 9/1984 | Kotzur | ....................... 277/347 |
| 4,575,100 A * | 3/1986 | Hay et al. | .................... 277/347 |
| 5,192,083 A * | 3/1993 | Jones et al. | ................ 277/411 |
| 5,215,384 A * | 6/1993 | Maier | ........................... 384/99 |
| 5,370,402 A * | 12/1994 | Gardner et al. | ............. 277/411 |
| 5,632,493 A * | 5/1997 | Gardner | ...................... 277/411 |
| 6,227,547 B1 * | 5/2001 | Dietle et al. | ................ 277/336 |
| 6,247,848 B1 | 6/2001 | Iwaki et al. | |
| 6,276,831 B1 | 8/2001 | Takahashi et al. | |
| 6,918,739 B2 * | 7/2005 | Addis | ............................ 415/1 |
| 2003/0030225 A1 * | 2/2003 | Uesugi et al. | .............. 277/431 |

* cited by examiner

Primary Examiner—Alison K. Pickard
(74) Attorney, Agent, or Firm—Michael Best & Friedrich LLP

(57) ABSTRACT

A seal assembly and cartridge for sealing a space between a rotating member and a stationary member in which a sleeve extends around the rotating member and with the inner surface of the sleeve being spaced from the outer surface of the rotating member to form a gap. Pressurized fluid is introduced to the sleeve to establish and maintain a predetermined gap between the sleeve and the rotating member, so that the pressure of the fluid can be varied to maintain the predetermined gap despite variations of the diameter of the rotating member during its rotation.

17 Claims, 5 Drawing Sheets

SEAL ASSEMBLY, CARTRIDGE, AND METHOD

BACKGROUND

This invention relates to an improved seal and gas bearing cartridge for sealing against the flow of fluid between a rotating member and a stationary member.

Conventional sealing systems associated with large rotary machines are often inadequate to prevent leakage through the gap between a rotating member and its associated stationary member. Thus, additional sealing techniques have been employed to provide further sealing. In these arrangements it is desirable, if not necessary, to maintain a fixed, minimum gap between the rotating member and the stationary member to achieve proper sealing. However, due to changes in size, or diameter, of the rotating member when operating, due to centrifugal forces, thermal expansion and contraction, etc., it is difficult to maintain a precise minimum gap between the members.

DETAILED DESCRIPTION

Figure 1:
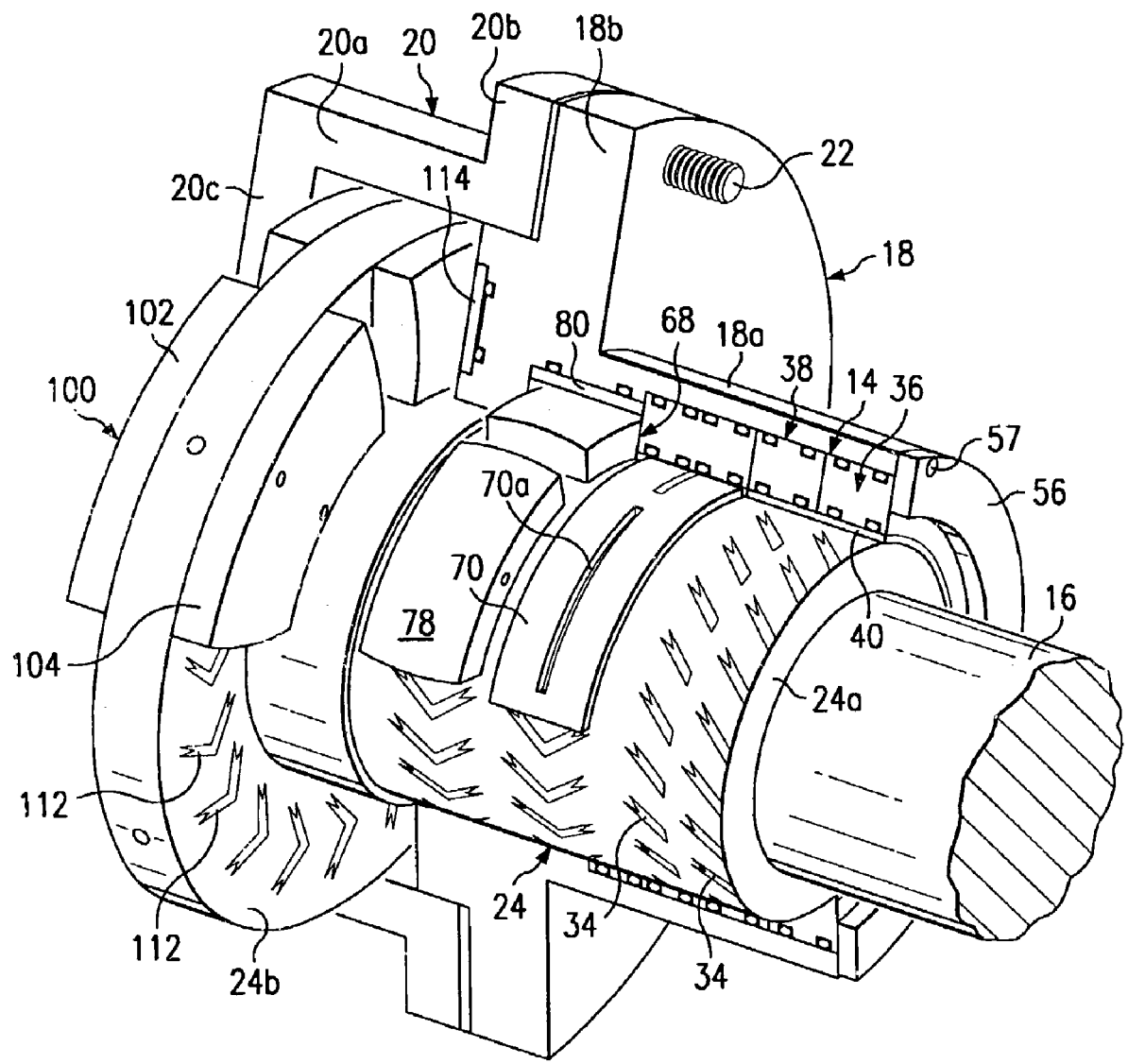
FIG. 1 is an isometric view of a seal and gas bearing cartridge according to one embodiment of the present invention with a portion of the assembly being broken away.
Figure 2:
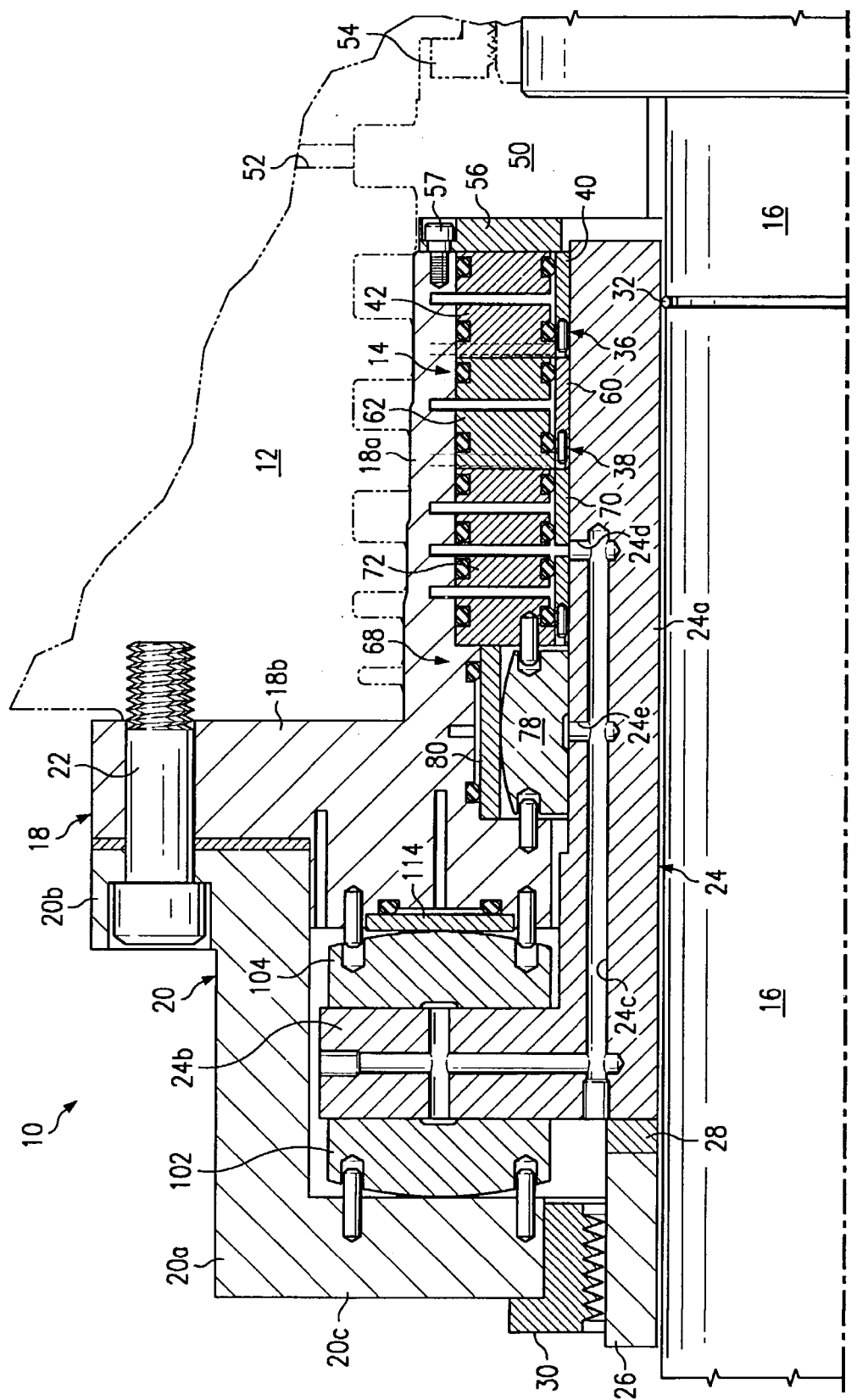
FIG. 2 is a longitudinal sectional view of the cartridge of FIG. 1.

Referring to FIGS. 1 and 2, the seal and gas bearing cartridge is referred to generally by reference numeral 10 and is shown, for the purpose of example, in use with a gas compressor 12.

The cartridge 10 includes a gas seal assembly 14 mounted to the housing of the compressor 12 in a manner to be described, and extending around a shaft 16 that rotates in the compressor housing. The seal assembly 14 and the corresponding portion of the shaft 16 extend within a portion of an inner housing 18 that includes a cylindrical portion 18a surrounding the seal assembly 14, and an annular flange 18b extending outwardly from one end portion of the cylindrical portion 18a. An outer housing 20 is disposed adjacent the inner housing 18 and includes a cylindrical portion 20a, an annular flange 20b extending from one end portion of the cylindrical portion and abutting the flange 18b, and a closed end portion 20c extending from the other end of the cylindrical portion.

The flange portion 18b of the inner housing 18 is bolted to a surface of the housing of the compressor 12, and the flange portion 20b of the outer housing 20 is bolted to the flange portion 18b of the inner housing, by a series of angularly spaced bolts 22, one of which is shown. The seal assembly 14 and the cylindrical portion 18a of the inner housing 18 extend in an annulus formed between an inner surface of the housing of the compressor 12 and the corresponding outer surface of the shaft 16.

A sleeve 24 extends around the shaft 16 and between the shaft and the seal assembly 14 and the corresponding portions of the housings 18 and 20. The sleeve 24 includes a cylindrical portion 24a whose inner surface extends around the outer surface of the shaft 16 with no clearance, and a flanged portion 24b extending radially outwardly from one end portion of the cylindrical portion.

As better shown in FIG. 2, a nut 26 is threadedly engaged with the shaft 16, and a washer 28 extends between the nut and the corresponding end of the shaft to lock and center the sleeve on the shaft. The sleeve 24, the nut 26, and the washer 28 rotate with the shaft 16. A fixed annular labyrinth seal 30 is disposed between the end portion 20c of the outer housing 20 and the nut 26 for sealing against the entry of any contaminants from outside the gas compressor 12. An O-ring 32 is provided in the interface between the sleeve portion 24a and the shaft 16 to prevent leakage of gas therethrough.

As shown in FIG. 1, a set of spaced, relatively shallow, grooves 34 are formed in the outer surfaces of the sleeve portion 24a and extend for the length thereof for sweeping gas in a manner to be described.

Figure 3:
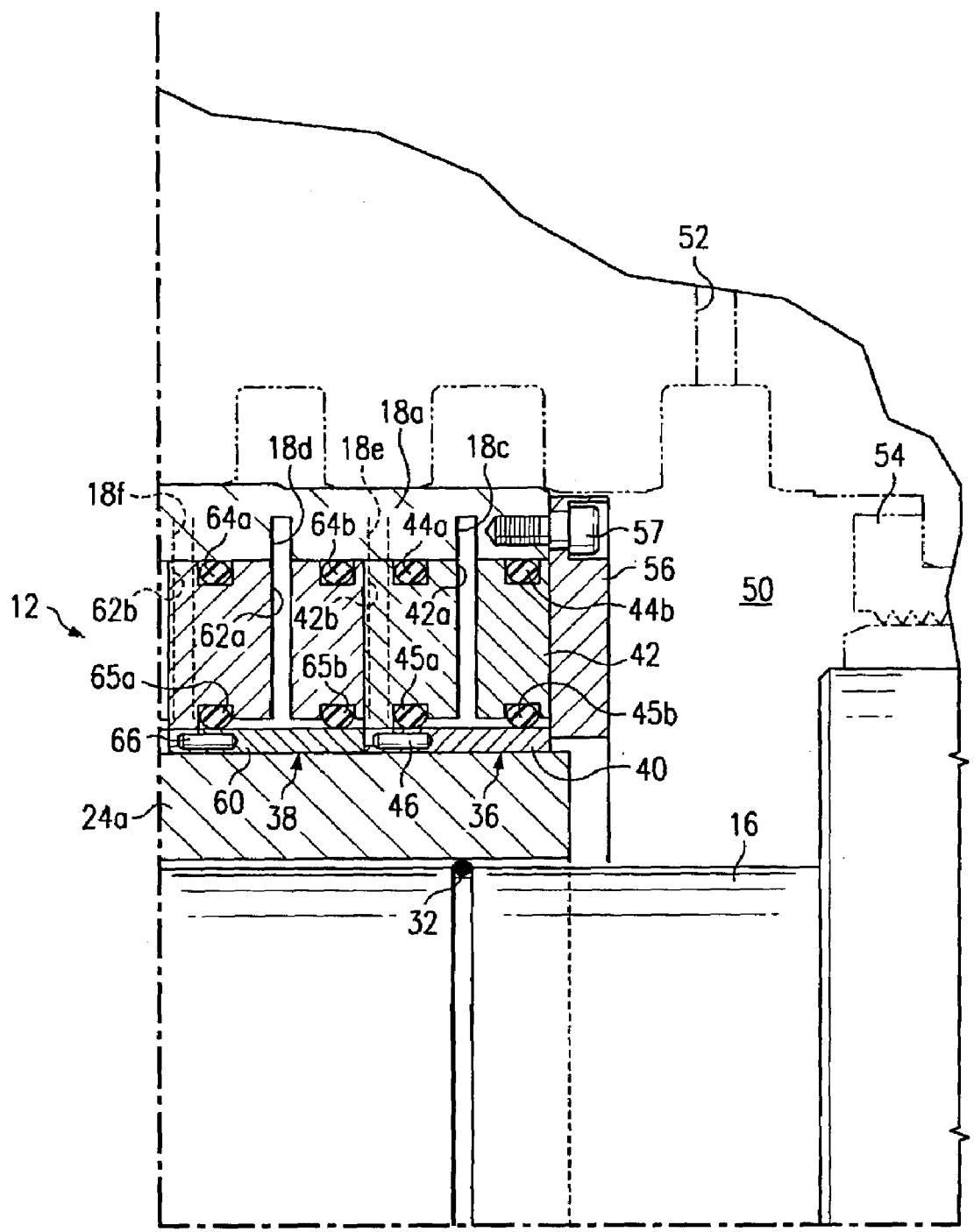
FIGS. 3–5 are enlarged views of portions of the cartridge depicted in FIG. 2.

The gas seal assembly 14 includes a primary seal assembly 36 extending around the sleeve portion 24a and a secondary seal assembly 38 also extending around the sleeve portion 24a and adjacent the seal assembly 36. Referring to FIGS. 2 and 3, the seal assembly 36 includes a sleeve 40 extending around the sleeve portion 24a with a slight clearance, and an annular housing 42 extending around the sleeve 40. Two axially spaced O-rings 44a and 44b extend in corresponding grooves formed in the outer surface of the housing 42 and engage the corresponding inner surfaces of the housing portion 18a; and two axially spaced O-rings 45a and 45b extend in corresponding grooves formed in the inner surface of the housing 42 and engage the corresponding outer surfaces of the sleeve 40. A plurality of angularly spaced dowels 46 (one of which is shown) extend from one end of the sleeve 40 into corresponding grooves formed in an extended inner surface of the housing 42 to prevent rotation of the sleeve.

A radial bore 42a is formed through the housing 42 and is in alignment with a counter bore 18c formed in the inner surface of the housing portion. It is understood that an inlet (not shown) is provided in the housing 18 to receive gas and pass it to the counter bore 18c, and therefore through the bore 42a, which gas acts against the sleeve 40 to force it radially towards the sleeve portion 24a as necessary. The pressure of the gas can be adjusted to change the diameter of the sleeve 40 and maintain a gap of minimal clearance between the inner surface of the sleeve and the outer surface of the sleeve portion 24a even when the diameter of the sleeve portion varies due to the centrifugal forces acting on it. Although only one counter bore 18c and one bore 42a are shown and described above, it is understood that a series of identical counter bores and bores can be angularly spaced around the shaft 16.

A reservoir 50 is formed in the compressor 12 adjacent the seal assembly 36 and the sleeve portion 24a and is adapted to receive clean gas, such as nitrogen, via a bore 52 disposed through the compressor 12. A labyrinth seal 54 is disposed adjacent the reservoir 50 for sealing against leakage of process gas from the compressor 12. However, as stated above, the pressure drop across the seal 54 is often too great to prevent leakage of the process gas across the latter seal, and if dirty, this leaking process gas is harmful to the environment. Therefore, the pressure of the clean gas in the reservoir 50 is maintained at a higher value than the pressure of the process gas, thereby preventing the leakage of process gas across the seal 54. (In this context, it should be noted that in instances where the process gas in the compressor 12 is clean gas, injection of clean gas through the bore 52 and into the reservoir 50 is not necessary and the reservoir can receive the clean process gas that leaks across the seal 54. In the latter case the bore 52 may be capped via a plug [not shown] at its outer end to prevent leakage of gas therethrough.)

A retaining ring 56 is affixed to the end of the housing portion 18a adjacent the reservoir 50 by a series of angularly spaced bolts 57, one of which is shown.

The sleeve assembly 38 is formed in substantially the same manner as the sleeve assembly 36 and, as such, includes a sleeve 60 extending around a portion of the sleeve portion 24a, and an annular housing 62 extending around the sleeve 60. Two axially spaced O-rings 64a and 64b extend in corresponding grooves formed in the outer surface of the housing 62 and engage the corresponding inner surfaces of the housing portion 18a; and two axially spaced O-rings 65a and 65b extend in corresponding grooves formed in the inner surface of the housing 62 and engage the corresponding outer surfaces of the sleeve 60. A plurality of angularly spaced dowels 66 (one of which is shown) extend from one end of the sleeve 60 into corresponding grooves formed in an extended inner surface of the housing 62 to prevent rotation of the sleeve.

A radial bore 62a is formed through the housing 62 and is in alignment with a counter bore 18d formed in the inner surface of the housing portion 18a. It is understood that an inlet (not shown) is provided in the housing 18 to receive gas and pass it to the counter bore 18d, and therefore through the bore 62a, which gas acts against the sleeve 60 to force it in a radial direction towards the sleeve portion 24a as necessary. Thus, the pressure of the gas can be adjusted to change the diameter of the sleeve 60 and maintain a gap of minimal clearance between the sleeve and the sleeve portion 24a even when the diameter of the sleeve portion 24a varies due to the centrifugal forces acting on it. Although only one counter bore 18d and bore 62a are shown and described above, it is understood that a series of counter bores and bores can be angularly spaced around the shaft 16.

An additional radial bore 42b is formed through the housing 42, is axially spaced from the bores 42a and 62a, and is in alignment with a counter bore 18e formed in the housing portion 18a. It is understood that the counter bore 18e is connected to an outlet in the housing of the compressor 12 for venting any gas that may leak through the sleeve assembly 36. Although only one counter bore 18e and bore 42b are shown and described above, it is understood that a series of counter bores and bores can be angularly spaced around the shaft 16.

In a like manner, an additional radial bore 62b is formed through the housing 62, is axially spaced from the bores 42a and 62a, and is in alignment with a counter bore 18f. It is understood that the counter bore 18f is connected to an outlet in the housing of the compressor 12 for venting any gas that may leak through the sleeve assembly 38. Although only one counter bore 18f and bore 62b are shown and described above, it is understood that a series of counter bores and bores can be angularly spaced around the shaft 16.

Figure 4:
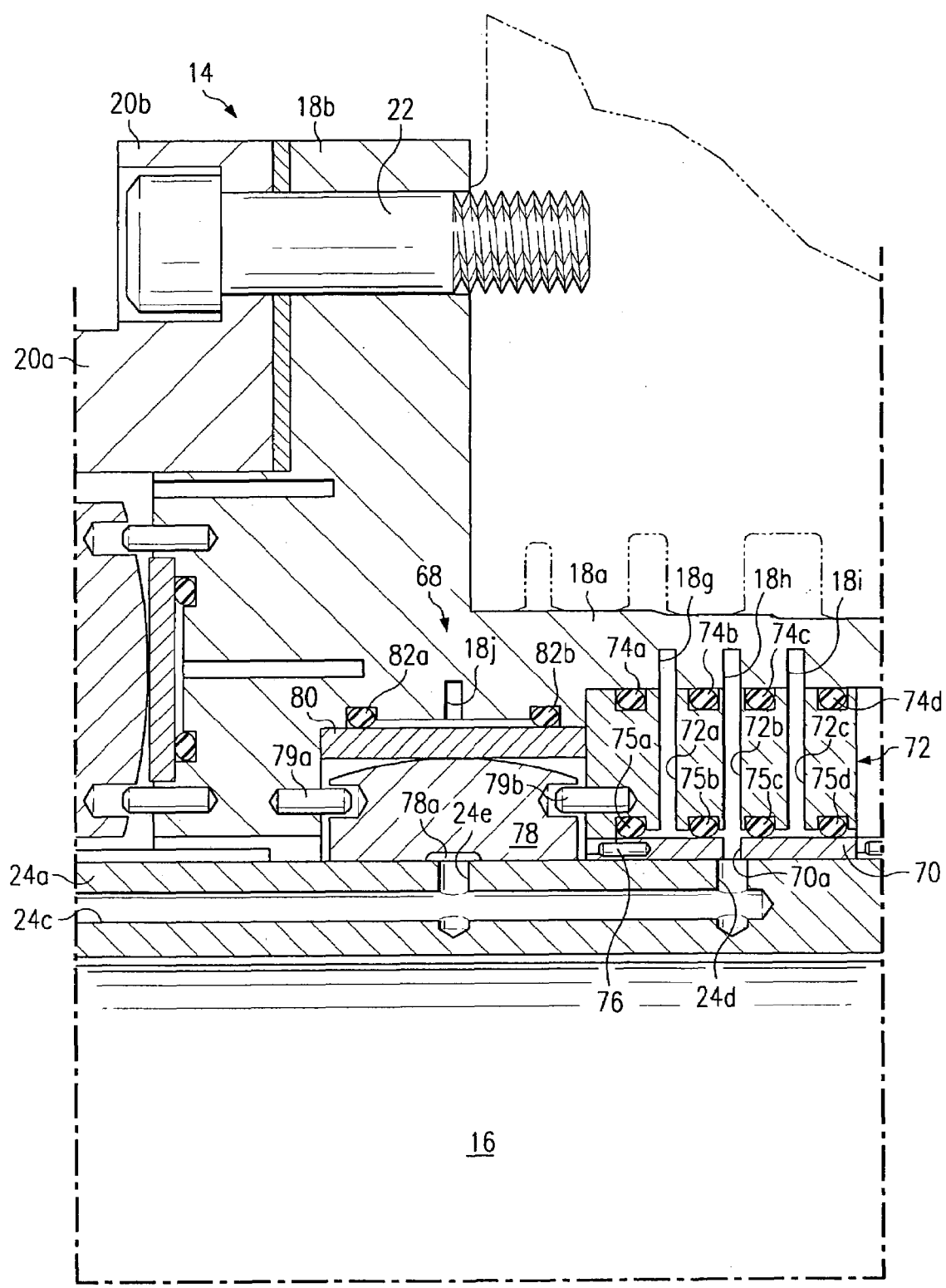

As better shown in FIGS. 2 and 4, the cartridge 10 also includes a journal bearing assembly 68 surrounding the shaft 16 and located adjacent the seal assembly 38. The assembly 68 includes a sleeve 70 extending around the sleeve portion 24a with a slight clearance, and an annular housing 72 extending around the sleeve 70. Four axially spaced O-rings 74a, 74b, 74c, and 74d extend in corresponding grooves formed in the outer surface of the housing 72 and engage the corresponding inner surfaces of the housing portion 18a. Four axially spaced O-rings 75a, 75b, 75c, and 75d extend in corresponding grooves formed in the inner surface of the housing 72 and engage the corresponding outer surfaces of the sleeve 70. A plurality of angularly spaced dowels 76 (one of which is shown) extend from one end of the sleeve 70 into corresponding grooves formed in an extended inner surface of the housing 72 to prevent rotation of the sleeve.

Three axially-spaced radial bores 72a, 72b and 72c are formed through the housing 72 and are in alignment with three counter bores 18g, 18h, and 18i, respectively, formed in the inner surface of the cylindrical portion 18a of the housing 18. It is understood that an inlet (not shown) is provided in the housing 18 to receive gas and pass it to the counter bores 18g, 18h, and 18i and therefore through the bores 72a, 72b, and 72c which gas acts against the sleeve 70 to force it in a radial direction towards the sleeve portion 24a. Thus, the pressure of the gas can be adjusted to increase or decrease the diameter of the sleeve 70 and maintain a gap of minimal clearance between the sleeve and the sleeve portion 24a, even when the diameter of the sleeve portion 24a varies due to the centrifugal forces acting on it.

Although only one counter bore 18g, one counter bore 18h, and one counter bore 18i are shown and described above, it is understood that a series of each of these counter bores can be angularly spaced around the shaft 16. Similarly, although only one bore 72a, one bore 72b, and one bore 72c are shown and described above, it is understood that a series of each of these bores can be angularly spaced around the shaft 16.

As better seen in FIG. 1, a series of angularly spaced, angularly extending slots 70a are formed through the sleeve 70 in alignment with the bore 72b (FIG. 4). Therefore, some of the gas from the bore 72b directed towards the sleeve 70 as discussed above passes into and through the slots 70a.

Referring to FIGS. 2 and 4, a series of angularly spaced axial bores 24c (one of which is shown) is formed in the sleeve portion 24a, and a series of angularly spaced radial ports 24d register with the bore 24c and are aligned with the slots 70a. Thus, the gas passing through the slots 70a passes into the ports 24d when the slots and the ports align during rotation of the shaft 16 and the sleeve 24. This gas from the ports 24d flows into their respective bores 24c for further use that will be described.

As better shown in FIGS. 1 and 4, the journal bearing assembly 68 also includes a series of angularly extending pads 78 which are disposed in an annular groove or notch formed in the housing 18. The pads 78 are angularly spaced around the sleeve portion 24a, adjacent the corresponding ends of the housing 72 and the sleeve 70, and extend between the sleeve portion 24a and a corresponding portion of the housing 18. The inner surfaces of the pads 78 are in a slightly-spaced relation to the outer surface of the sleeve portion 24a, and are held in position by a series of angularly spaced dowels 79a (one of which is shown in FIG. 4) extending in aligned notches formed in the housing 18 and the pads, respectively; and a series of angularly spaced dowels 79b extending in aligned notches formed in the housing 72 and the pads 78, respectively.

A groove 78a is formed on the inner surface of each pad 78 and is in alignment with a series of ports 24e (one of which is shown) extending from the bore 24c. Thus, some of the gas flowing in the bore 24c is supplied to the ports 24e and then flows into the groove 78a in each pad 78 to form a bearing.

A pad sleeve 80 extends in the bottom of the above-mentioned groove or notch and around the pads 78, with the inner surface of the sleeve being slightly spaced from the outer surface of the pads. A counter bore 18j is formed in the inner surface of the cylindrical portion 18a of the housing 18, and it is understood that an inlet (not shown) is provided in the housing 18 to receive gas and pass it to the counter bore and therefore to the outer surface of the sleeve 80. Two axially spaced O-rings 82a and 82b extend in grooves formed in the inner surface of the housing 18 and engage the corresponding outer surface of the sleeve 80 to seal the interface between the inner housing 18 and the sleeve. Thus, the pressure of the gas in the counter bore 18j, and therefore the pressure on the sleeve 80 and the pad 78 can be adjusted to maintain a predetermined gap between the pad 78 and the sleeve portion 24a. Also, the sleeve 80 acts as a damper to guard against any harmful vibrational effects associated with high-speed rotation of the shaft 16 and the sleeve 24.

Figure 5:
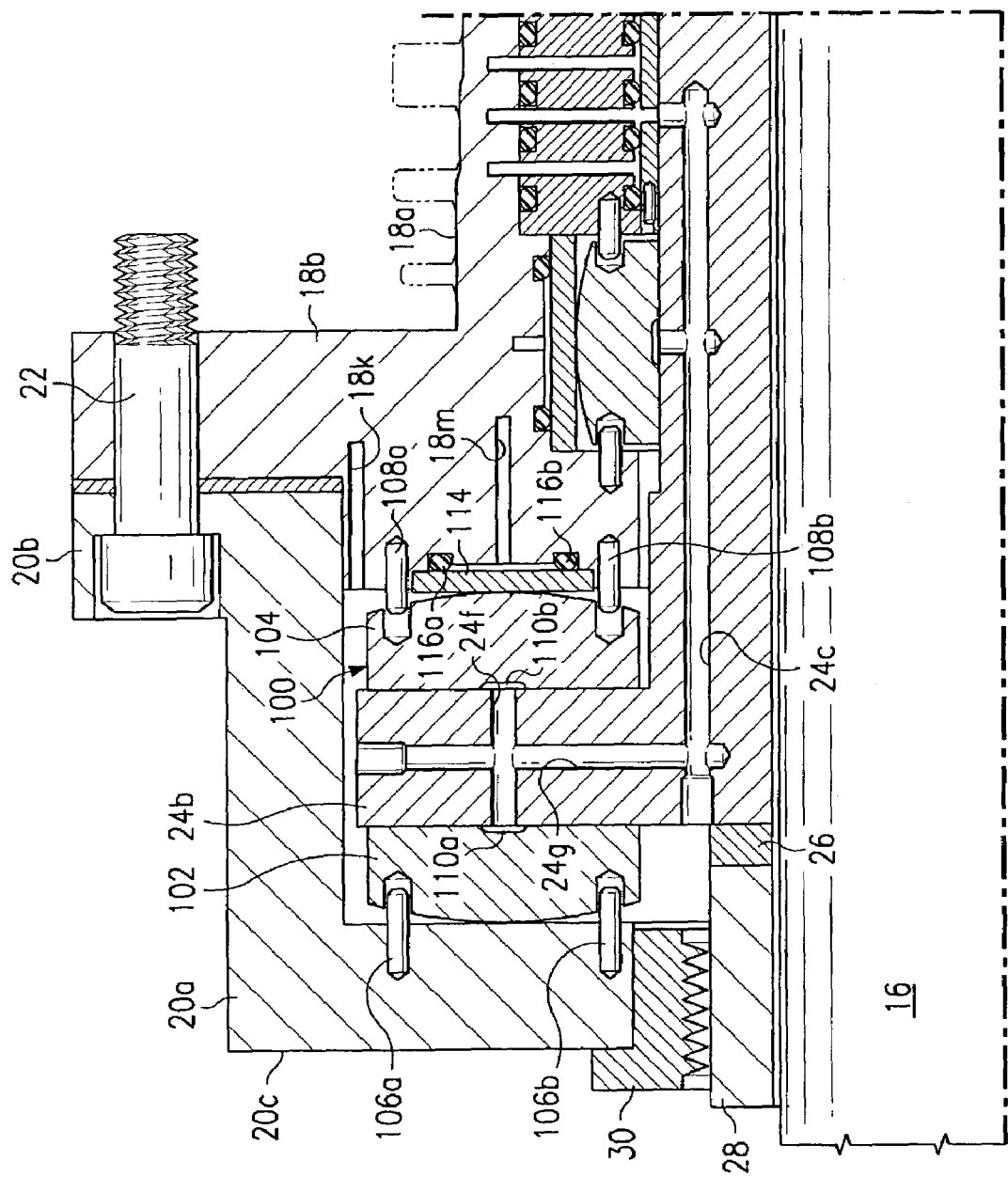

As better shown in FIGS. 1 and 5, the cartridge 10 also includes a thrust bearing 100 for controlling axial movement of the shaft 16. The thrust bearing 100 comprises a plurality of angularly spaced pads 102 and 104 (two of each of which are shown in FIG. 1) disposed on opposite faces of the sleeve portion 24b. Each pad 102 is secured and held stationary to the housing 20 by a pair of spaced dowels 106a and 106b which extend in grooves formed in the latter housing and the pad; and each pad 104 is secured and held stationary to the housing 18 by a pair of spaced dowels 108a and 108b which extend in grooves formed in the latter housing and the pad.

A pair of grooves 110a and 110b are formed in the inner surfaces of each of the pads 102 and 104, respectively, and register with the ends of a plurality of transverse, or axially extending, bores 24f (one of which is shown) angularly spaced around the sleeve portion 24b. A plurality of angularly spaced, radially extending bores 24g also extend through the sleeve portion 24b and intersect with the bores 24f. The bores 24g also extend to the bore 24c of the sleeve portion 24a so that some of the gas passing through the bore 24c passes into and through the bores 24g and, via the bores 24f, to the grooves 110a and 110b to allow bearing of the sleeve portion 24b.

As shown in FIG. 1, a set of grooves 112 are formed on the opposite faces of the sleeve portion 24b for sweeping any gas in the interface between the latter faces and the corresponding surfaces of the pads 102 and 104. Referring to FIG. 5, a series of angularly spaced counter bores 18k are formed in the housing portion 18b for venting any gas leaking through the latter interfaces to an outlet (not shown) formed through the housing 18.

An annular plate 114 is disposed in a groove formed in the corresponding face of the housing 18 and adjacent the pads 104. A plurality of angularly spaced counter bores 18m (one of which is shown) are formed in the housing 18 in alignment with the plate 114. Two angularly spaced O-rings 116a and 116b are disposed in circular grooves formed in the housing 18 and engage the plate 114 to seal the interface between the plate and the housing. It is understood that an inlet (not shown) is provided in the housing 18 to receive gas and pass it to the counter bores 18m which direct the gas against the plate 114 to force it against the pads 104. Thus, the pressure of the fluid directed against the plate 114 can be varied to adjust the axial position of the sleeve portion 24b and to maintain predetermined gaps between the sleeve portion 24b and the pads 102 and 104. The plate 114 also acts as a damper to guard against any harmful vibrational effects on the pads 104 associated with high-speed rotation. Although not depicted, it is understood that a plate, identical to the plate 114, and a plurality of corresponding angularly spaced counter bores formed in the housing 20 may additionally be employed adjacent the pads 102 to further adjust the axial position of the sleeve portion 24b and to maintain predetermined gaps between the sleeve portion 24b and the pads 102 and 104.

Prior to the operation of the compressor, and assuming that it is to operate with dirty process gas, clean gas is introduced into the reservoir 50 via the bore 52 prior to activation of the compressor 12. Gas is introduced into the counter bores 18c (FIG. 3) and flows through the bores 42a of the housing 42 of the seal assembly 36 and against the sleeve 40. This forces the sleeve 40 inwardly in a radial direction towards the sleeve portion 24a until it establishes a minimum gap to seal against gas flow from the reservoir 50 through the interface between the sleeve portion 24a and the sleeve 40.

If the sleeve assembly 36 is not functioning properly and gas from the reservoir 50 does, in fact, leak through the interface between the sleeve portion 24a and the sleeve 40, the sleeve assembly 38 is activated by introducing gas into the counter bores 18d. This latter gas flows through the bores 62a of the housing 62 and against the sleeve 60 to force it in a radial direction towards the corresponding surface of the sleeve portion 24a to establish a minimum gap to seal against gas flow from the reservoir 50 through the interface between the sleeve portion 24a and the sleeve 60.

In either case, the vent openings registering with the counter bores 18e are closed so that there is no venting of the gas.

In operation and assuming that the seal assembly 36 is functioning properly, the compressor 12 is activated and the shaft 16, and therefore the sleeve 24, begin to rotate. The seal assembly 36 (FIG. 2) seals against the leakage of gas from the reservoir 50 and through the interface between the sleeve portion 24a and the sleeve 40 in the manner discussed above. However, as the sleeve portion 24a begins to rotate at relatively high speeds, its diameter will increase due to centrifugal force and thermal expansion. To prevent the sleeve portion 24a from contacting the sleeve 40 during rotation, the pressure of the gas in the counter bore 18c, and therefore the bore 42a, is reduced in order to decrease the diameter of the sleeve 40 and maintain the minimum gap between the latter sleeve and the sleeve portion 24a and therefore maintain the seal. The vent openings registering with the counter bores 18e are opened so that any gas leakage through the sleeve assembly 36 either vents through the bore 42b or passes in an axial direction to the gap between the sleeve portion 24a and the sleeve 60 of the sleeve assembly 38.

If the sleeve assembly 38 has been activated under the conditions discussed above, the pressure of the gas in the counter bore 18d and the bore 62a of the sleeve assembly 38 is reduced in order to decrease the diameter of the sleeve 60 to accommodate the expansion of the sleeve portion 24a and maintain the minimum gap between it and the sleeve portion 24a. The vent openings registering with the counter bores 18f are opened so that any gas leakage through the sleeve assembly 38 vents through the bore 62b.

As rotation of the shaft 16 and the sleeve 24 continues, the pressure of the gas acting on the sleeves 40 and 60 as described above is adjusted as needed to maintain the minimum gap between the sleeves and the sleeve portion 24a, to maintain the seals, yet accommodate any changes in the outer diameter of the sleeve portion due to the conditions described above.

During this operation, and with reference to FIG. 4, gas is also supplied through the counter bores 18g, 18h and 18i and flows through the bores 72a, 72b, and 72c, respectively, and against the sleeve 70 to force it in a radial direction against the corresponding surface of the sleeve portion 24a. Thus, the gap between the sleeve 70 and the sleeve portion 24a can be controlled by increasing or reducing the pressure of the gas, in the manner described above, to insure that a proper minimum gap and seal is established and maintained between the sleeve 70 and the sleeve portion 24a.

As better shown in FIGS. 4 and 5, some of the gas passing from the counter bores 18h and through the bores 72b does not act against the sleeve 70 as described above, but, rather, passes through the slots 70a in the sleeve 70. In particular, as the shaft 16 and the sleeve 24 rotate, a portion of the gas in the slots 70a flows into and through the ports 24d (FIG. 4) when the ports radially align with the slots during the rotation. This gas entering the ports 24d pass through the bores 24c, and a portion of the gas passes through the ports 24e and into the grooves 78a in the pads 78 to force the pads radially outwardly. Thus, control of the gas pressure and flow through the counter bores 18h and the bores 72b enables the gaps between the pads 78 and the sleeve portion 24a to be controlled. The remaining portion of the gas in the bores 24c that does not enter the ports 24e passes into and through the bores 24g (FIG. 5) in the sleeve portion 24b and into the grooves 110a and 110b to control the axial position of the sleeve 24 and to maintained proper minimum gaps between the sleeve portion 24b and the pads 102 and 104.

Gas is also introduced into the bores 18m and 24f to act against the plate 114 and therefore the pad 104 and to act against the pad 102, respectively, to maintain a predetermined gap between the sleeve portion 24b and the pads 102 and 104 and to vary the axial position of the sleeve 24 as needed.

During the above operations, any gas from the reservoir 50 that enters the gaps between the sleeve portion 24a and the sleeves 40, 60 and 70, including the gas not passing through the ports 24d, is swept by the grooves 34 formed on the sleeve portion 24a to generate dynamic pressure between the sleeve portion 24a and the sleeves 40, 60, and 70. This dynamic pressure prevents contact between the sleeves 40, 60, and 70 and the sleeve portion 24a and aids in centering the sleeves 40, 60, and 70 relative to the sleeve portion 24a. Similarly, any gas entering the interface between the opposite faces of the sleeve portion 24b (FIGS. 4 and 5) and the corresponding surfaces of the pads 102 and 104 are swept by the grooves 112 and vented from the housing 18 via the counter bores 18k.

During all of the above operations the labyrinth seal 30 seals against the entry of any contaminants from outside the gas compressor 12.

Although not shown in the drawings, it is understood that integrated sensors can be provided to measure the gaps between the sleeve portion 24a and the sleeves 40, 60 and 70, along with a computer that responds to the measurements and controls the gas flow against the sleeves accordingly.

As can be appreciated, in instances where the process gas in the compressor 12 is clean gas, injection of clean gas through the bore 52 and into the reservoir 50 is not necessary and the reservoir can receive the clean process gas that leaks across the seal 54. In the latter case the bore 52 may be capped via a plug [not shown] at its outer end to prevent leakage of gas therethrough.) Otherwise the operation of the cartridge 10 is the same as described.

It is understood that several variations may be made in the foregoing without departing from the scope of the invention. For example, the number of seal assemblies and pads can be varied and the thrust bearing can be eliminated. Also, although the grooves 34 are depicted as formed on the sleeve portions 24a and 24b, these grooves may alternatively be formed on the components adjacent to the sleeve. Also, the above spatial references, such as "radial," "axial," "inward," and "outward," are for the purpose of illustration only and do not limit the specific orientation or location of the structure described above.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. In the claims, means-plus-function clauses are intended to cover the structures described herein as performing the recited function and not only structural equivalents, but also equivalent structures.

What is claimed is:

1. A cartridge seal assembly for sealing a space between a rotating member and a stationary member, the rotating member comprising a sleeve having a cylindrical member and an annular flange member extending outwardly from the cylindrical member and a shaft attached to the sleeve whereby rotation of the shaft causes rotation of the sleeve, the cartridge seal assembly comprising:

a seal assembly comprising a sleeve extending around the rotating member and with the inner surface of the sleeve being spaced from the outer surface of the rotating member to form a gap, a housing extending around the sleeve extending around the rotating member, at least one bore formed in the housing for receiving pressurized fluid and introducing it to the sleeve to establish a predetermined gap between the sleeve and the rotating member, so that the pressure of the fluid can be varied to maintain the predetermined gap despite variations of the diameter of the rotating member during its rotation, and further comprising a journal bearing assembly located adjacent to the seal assembly and including at least one bearing pad spaced axially from the seal assembly sleeve and extending over the cylindrical member of the rotating member with the inner surface of the pad being spaced from the outer surface of the cylindrical member to form a gap, and at least one other bore formed in the housing for receiving pressurized fluid and introducing the pressurized fluid to the pad to establish a predetermined gap between the pad and the cylindrical member, so that the pressure of the latter fluid can be varied to maintain the latter predetermined gap despite variations of the diameter of the cylindrical member during its rotation.

2. The cartridge of claim 1 wherein the pad is mounted to the housing.

3. The assembly of claim 1 further comprising a plate extending between the pad and the housing so that the fluid acts against the plate and the plate acts against the pad.

4. The assembly of claim 1 further comprising a plurality of grooves formed on the outer surface of the cylindrical member to sweep any fluid passing through the gap between the cylindrical member and the pad to generate a dynamic pressure between the cylindrical member and the pad.

5. A seal assembly for sealing a space between a rotating member and a stationary member, the rotating member comprising a sleeve having a cylindrical member and an annular flange member extending outwardly from the cylindrical member and a shaft attached to the sleeve whereby rotation of the shaft causes rotation of the sleeve, the seal assembly comprising a sleeve extending around the rotating member and with the inner surface of the sleeve being spaced from the outer surface of the rotating member to form a gap, a housing extending around the sleeve extending around the rotating member, at least one bore formed in the housing for receiving pressurized fluid and introducing it to the sleeve to establish a predetermined gap between the sleeve and the rotating member, so that the pressure of the fluid can be varied to maintain the predetermined gap despite variations of the diameter of the rotating member during its rotation and further comprising at least one pad extending adjacent the flange member with the inner surface of the pad being spaced from the outer surface of the flange member to form a gap, means for introducing pressurized fluid to the pad to establish a predetermined gap between the pad and the flange member, so that the pressure of the latter fluid can be varied as needed to vary the axial position of the sleeve.

6. The assembly of claim 5 further comprising a plurality of grooves formed on the outer surface of the flange member to sweep any fluid passing through the gap between the flange member and the pad and to generate a dynamic pressure between the flange member and the sleeve.

7. The cartridge of claim 5 wherein the pad is mounted to the housing and wherein the means comprises a bore formed through the housing.

8. The assembly of claim 7 further comprising a plate extending between the pad and the housing so that the fluid acts against the plate and the plate acts against the pad.

9. The assembly of claim 5 wherein the rotating member forms a portion of a rotary machine having an enclosure and further comprising a housing which receives the sleeve and the first-mentioned housing to form a cartridge that is attachable to the enclosure.

10. A bearing and seal cartridge comprising
a housing,
a rotating member disposed in the housing, the rotating member comprising a sleeve having a cylindrical member and an annular flange member extending outwardly from the cylindrical member and a shaft attached to the sleeve whereby rotation of the shaft causes rotation of the sleeve,
a sealing sleeve extending around the rotating member and within the housing, the inner surface of the sleeve being spaced from the outer surface of the rotating member to form a gap, and at least one bore formed in the housing for receiving pressurized fluid and introducing it to the sleeve to establish a predetermined gap between the sleeve and the rotating member, so that the pressure of the fluid can be varied to maintain the predetermined gap despite variations of the diameter of the rotating member during its rotation and
further comprising at least one bearing pad spaced axially from the sealing sleeve and extending over the cylindrical member of the rotating member with the inner surface of the pad being spaced from the outer surface of the cylindrical member to form a gap, at least one other bore formed in the housing for receiving pressurized fluid and introducing pressurized fluid to the pad to establish a predetermined gap between the pad and the cylindrical member, so that the pressure of the latter fluid can be varied to maintain the latter predetermined gap despite variations of the diameter of the cylindrical member during its rotation.

11. The cartridge of claim 10 wherein the pad is mounted to the housing.

12. The cartridge of claim 10 further comprising a plate extending between the pad and the housing so that the fluid acts against the plate and the plate acts against the pad.

13. The cartridge of claim 10 further comprising a plurality of grooves formed on the outer surface of the cylindrical member to sweep any fluid passing through the gap between the cylindrical member and the pad to generate a dynamic pressure between the cylindrical member and the pad.

14. A bearing and seal cartridge comprising
a housing,
a rotating member disposed in the housing, the rotating member comprising a sleeve having a cylindrical member and an annular flange member extending outwardly from the cylindrical member and a shaft attached to the sleeve whereby rotation of the shaft causes rotation of the sleeve,
a sleeve extending around the rotating member and within the housing, the inner surface of the sleeve being spaced from the outer surface of the rotating member to form a gap, and at least one bore formed in the housing for receiving pressurized fluid and introducing it to the sleeve to establish a predetermined gap between the sleeve and the rotating member, so that the pressure of the fluid can be varied to maintain the predetermined gap despite variations of the diameter of the rotating member during its rotation and
further comprising at least one pad extending adjacent the flange member with the inner surface of the pad being spaced from the outer surface of the flange member to form a gap, means for introducing pressurized fluid to the pad to establish a predetermined gap between the pad and the flange member, so that the pressure of the latter fluid can be varied as needed to vary the axial position of the sleeve.

15. The cartridge of claim 14 further comprising a plurality of grooves formed on the outer surface of the flange member to sweep any fluid passing through the gap between the flange member and the pad and to generate a dynamic pressure between the flange member and the sleeve.

16. The cartridge of claim 14 further comprising a plate extending between the pad and the housing so that the fluid acts against the plate and the plate acts against the pad.

17. The cartridge of claim 14 wherein the pad is mounted to the housing and wherein the means comprises a bore formed through the housing.

* * * * *